(No Model.)
J. C. BELYEA.
VELOCIPEDE.
No. 443,890. Patented Dec. 30, 1890.
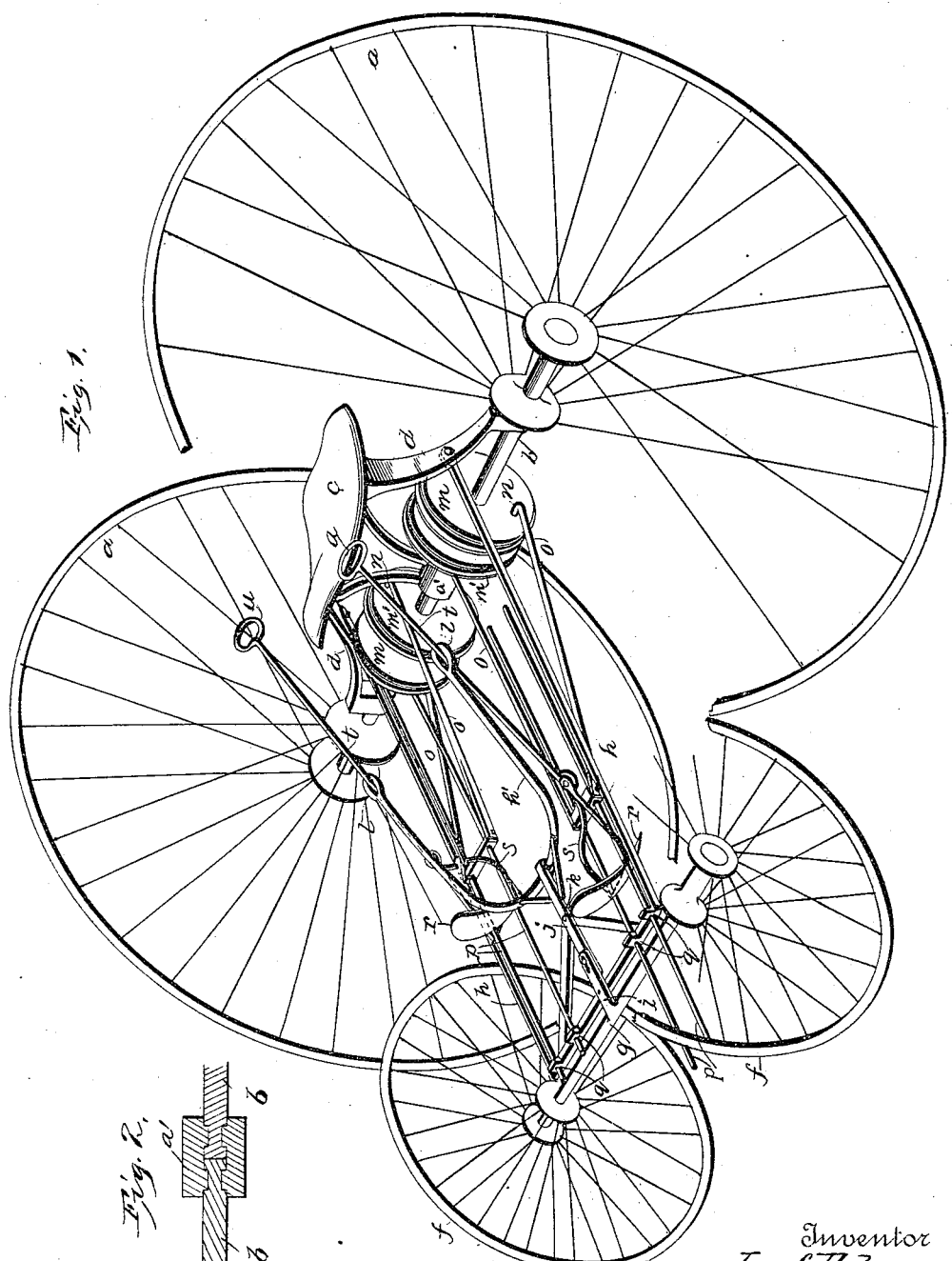
Witnesses
E. C. Duffy
H. E. Peck
Inventor
James C. Belyea
per O. E. Duff
Attorney

UNITED STATES PATENT OFFICE.

JAMES C. BELYEA, OF SABETHA, KANSAS, ASSIGNOR OF ONE-HALF TO IRVIN & KEPNER, OF SAME PLACE.

VELOCIPEDE.

SPECIFICATION forming part of Letters Patent No. 443,890, dated December 30, 1890.

Application filed May 14, 1890. Serial No. 351,734. (No model.)

*To all whom it may concern:*

Be it known that I, JAMES C. BELYEA, of Sabetha, in the county of Nemaha and State of Kansas, have invented certain new and useful Improvements in Velocipedes, (for which application has been filed in Canada dated May 16, 1890, Serial No. 53,393;) and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in velocipedes or vehicles of this class having more than two wheels.

The object of the invention is to provide an improved velocipede exceedingly strong, simple and durable in construction, and wherein the operating mechanism is so constructed and arranged that great propelling-power is obtained, and hence a high rate of speed can be attained, and the machine can be easily propelled uphill and upon rough country roads; and a further object is to utilize the full force, both hands and feet, of the operator in propelling the vehicle. These objects are accomplished by and this invention consists in certain novel features of construction and in combinations of parts, more fully described hereinafter, and particularly pointed out in the claims.

In the drawings, Figure 1 shows the machine in perspective. Fig. 2 is a section through the coupling uniting the main axle.

This machine is preferably a quadcycle having four wheels; but under suitable circumstances a single small wheel might be substituted for the two front wheels here shown.

*a a* indicate the two main wheels, mounted on the ends of the main driving-axle *b*. These wheels are of a suitable size and construction, and are preferably loosely mounted on the ends of the axles and provided with ratchet mechanism, so that the machine may be drawn backward without rotating the main axle, but so that when moving forward these wheels and the axle rotate together. The seat *c* is directly and centrally mounted on the main axle by suitable supports *d*, as shown.

*f f* are the two small front wheels, loosely mounted on the ends of the front axle *g*. This axle is shorter than the main axle, so that the front axle and wheels are partially located between the main wheels in the construction shown.

A supporting-frame *h* at its upper end is strongly mounted on the main axle and is suitably braced and strengthened. A rod or arm *i* is rigidly secured to the center of the front axle and extends rearwardly therefrom, and is pivoted between its ends by a strong joint to the lower end or cross bar of the frame *h*, so that the front axle and wheels can turn laterally independently of the frame. *j* is a horizontally-rocking lever pivoted between its ends at *k* to a portion of the frame *h*, having its lower end loosely jointed to the free end of arm *i*, so that when the upper end of lever *j* is moved laterally the front axle and wheels will be turned to direct the vehicle in the same direction through the medium of the arm *i*. The upper end of lever *j* is secured to the lower center of a U-shaped yoke *h'* above the frame *h*, with its ends extending up and provided with eyes or openings *l*. This guiding frame or yoke is so secured to the lever *j* that the ends of the yoke can swing vertically, but so that the yoke and lever *j* are rigid and move together when the yoke is swung laterally. Two pair of ratchet mechanisms *m m'* are located on the main axle, the pairs of said mechanisms being located on opposite sides of the center of the axle. The ratchet mechanisms are of any suitable construction, so that the casings can turn in one direction and will be locked to the wheel when turned in the opposite direction, and the ratchets of each pair face or operate in opposite directions. Each ratchet mechanism is provided with a reciprocating rod or pitman *o* at the upper laterally-bent ends *n*, journaled or loosely attached to the casing of their respective ratchet mechanisms so as to rotate them when reciprocated. At their lower ends each pair of rods *o* are pivoted to allow vertical swing to a slide or pair of slide-rods $p$. The two pair of slide-rods are located, respectively, on opposite sides and longitudinally of the frame $h$, and in substantially the same vertical planes with their respective ratchet mechanisms. These rods work and are confined in fixed bearings or boxes $q$, secured to cross-pieces of the frame $h$. Each pair of operating slide-rods carries a pivoted foot-piece or pedal $r$ to receive the feet of the operator, and by which the rods can be forced down.

Near each foot-piece a fork or U-shaped piece $s$ is strongly pivoted at its lower ends to the slide-rods to allow vertical swing of the forks.

$t\ t$ indicate two handle-bars having open handles $u\ u$ at their upper ends, and extending, respectively, through the loops or eyes $l\ l$ of the U-shaped guiding-yoke, and at their lower ends, respectively, pivoted to the upper end of a fork $s$, to allow lateral swing of the free end of the handle-bars. The operating slide-rods extend and reciprocate parallel with and beneath the respective limbs of the occupant.

In operation the feet are placed on the pedals and the handles grasped by the hands. The limbs are then extended one after the other and alternately drawn up with the front pieces. When a leg is extended, it forces down its pedal and respective slide-rods and the operating-rods $o$, and thereby operating one of the ratchet mechanisms on that side of the axle to rotate the axle, while the other ratchet runs loose. When the pedal has completed its downstroke, the slide-rods are drawn back by the hand on that side through the medium of the handle-bar, and during the upstroke the ratchet mechanism before idle now rotates the axle and the other runs loose. Each pair of rods $o$ is attached to the sides of casings of the respective ratchet mechanisms above and below the axle, so that when said rods reciprocate oppositely they will rotate their ratchet mechanisms and the axle in the same direction. When one pair of slide-rods is moving down the other is moving up, so that both are always acting on the axle at one time, and one hand and one foot are always exerting their force to rotate the axle.

When it is desired to guide the machine to the right or left the occupant merely inclines or leans his body to that side, thereby swinging the handle-bars in that direction, and by reason of the eyes $l$ the guiding-yoke is turned to that side; hence turning the front wheels and axles, as before mentioned. This is the most natural method of steering possible, as the body of a bicycle or tricycle rider always inclines toward the inner side of the machine when turning a curve.

The main axle is divided at the center and the two inner ends are separately journaled in and united by the block $a'$, located beneath the seat, as shown, so that the two wheels and their respective portions of the axle can rotate separately. Each wheel and its respective portion of the axle are provided with an operating-pedal and ratchet mechanisms, so that both wheels are driving-wheels and can be separately operated and actuated at different speeds. Great advantages are attained by this construction, particularly in turning curves, where one wheel rotates faster than the other.

By this machine the full force and power of the occupant is utilized in propelling the vehicle, and great speed can be attained and rough roads traveled with ease. By reason of the direct sliding motion the full force of the muscles of the legs, arms, and back are utilized in the most natural manner possible and without cramping or assuming unnatural positions, and the movements are free, easy, and natural. There is no lost power, as both reciprocations of the slide-rods are utilized in forwardly rotating the main axle. The ratchet-casings do not make complete revolutions; hence there are no dead-centers to overcome.

It will be seen that the handle-bars are allowed vertical swing to accommodate themselves to different persons by means of the forks and the manner of securing the steering-yoke, and that the manner of constructing the parts so as to attain the vertical and lateral swing of said bars can be varied, and that the pedals can be mounted and rendered adjustable in any suitable manner. It is also evident that various changes might be made in the form and arrangements of the parts described without departing from the spirit and scope of this invention. Hence I do not wish to limit myself strictly to the construction herein set forth.

What I claim is—

1. In a velocipede, the main axle and wheels, in combination with a pair of sliding reciprocating pedals connected with the axle to rotate the same forwardly, and a pair of handle-bars, each connected and moving with a pedal, as and for the purpose set forth.

2. In a velocipede, the combination, with the main axle, of the sliding and reciprocating pedals and the handle-bars reciprocating and moving therewith, the pedals being forced forward and connected with the axle to rotate the same forwardly and the handle-bars drawing the pedals back and continuing to rotate the axle, substantially as described.

3. The combination, with two sliding reciprocating pedals, of the main driving-axle and its wheels, a pair of driving ratchet mechanisms on said axle for each pedal, the mechanisms of each pair rotating in opposite directions, and connections from each pedal to its respective pair of ratchet mechanisms, so that when the pedal is reciprocating one mechanism or the other will be always rotating the axle, as set forth.

4. The main axle and its wheels, in combination with the supporting-frame, the reciprocating slide-rods connected with said axle to rotate the same and carrying the pedals, and the handle-bars pivoted to and moving with the slide-bars, as set forth.

5. The main axle and its wheels, the seat mounted on said axle, and the two pairs of opposite ratchet mechanisms, in combination with the supporting-frame, the sliding reciprocating pedals, connecting-rods loosely connecting each pedal with a pair of said opposite mechanisms, and the handle-bars connected to and moving with the pedals, substantially as described.

6. The combination, with the main axle with its wheels and the two pairs of opposite driving ratchet mechanisms on said axle, of the two sliding reciprocating pedals and the two pairs of loose rods connecting the pedals and ratchet mechanisms, one connecting-rod of each pair being secured to its ratchet mechanism below the axle and the other rod to its mechanism above the axle, as set forth.

7. The main and front axles and wheels and the frame extending between said axles and to which the front axle is pivoted to swing laterally, in combination with the slide-rods reciprocating longitudinally in the frame and carrying pedals and connected with the axle to continuously rotate the same, and the vertically and laterally swinging handle-bars carried by and moving with said bars, substantially as described.

8. In a velocipede, the combination, with the main axle and wheels and the front guiding axle and wheels, of the frame and driving mechanism, the vertically-swinging U-shaped steering-yoke having eyes in its upper end, the loose arm and lever connecting said yoke and the front axle, so that when the yoke is swung laterally the front wheels will be turned in the same direction, and the laterally-movable handle-bars extending up through said eyes, substantially as described.

In testimony that I claim the foregoing as my own I affix my signature in presence of two witnesses.

JAMES C. BELYEA.

Witnesses:
O. E. DUFFY,
C. M. WERLE.